Figure 1:
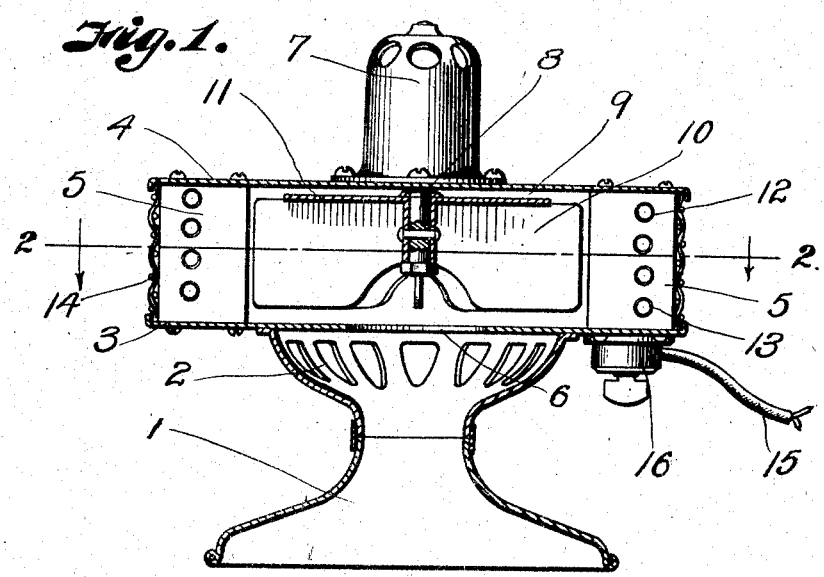

S. M. AND J. H. CARMEAN.
ELECTRIC HEATER.
APPLICATION FILED FEB. 25, 1921.

1,399,688.

Patented Dec. 6, 1921.

Inventors
Samuel M. Carmean
James H. Carmean
By Arthur C. Brown
Attorney

UNITED STATES PATENT OFFICE.

SAMUEL M. CARMEAN AND JAMES H. CARMEAN, OF KANSAS CITY, MISSOURI.

ELECTRIC HEATER.

1,399,688.  Specification of Letters Patent.  Patented Dec. 6, 1921.

Application filed February 25, 1921. Serial No. 447,705.

*To all whom it may concern:*

Be it known that we, SAMUEL M. CARMEAN and JAMES H. CARMEAN, citizens of the United States, residing at Kansas City, in the county of Jackson and State of Missouri, have invented certain new and useful Improvements in Electric Heaters; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to electric heaters for raising the temperature of air.

One of the objects of the invention is to provide a simple, durable and effective heater which will be inexpensive to manufacture and in which a current of air is directed in substantially radial stream lines about the axis of the impeller over heating elements so that the temperature of the air may be raised preparatory to passing from the heater casing.

The novel arrangement of parts and combinations of parts will be specifically referred to hereinafter, it being understood that changes in form, proportion and minor details of construction may be resorted to without departing from the spirit of the invention or sacrificing any of its advantages.

Figure 2:
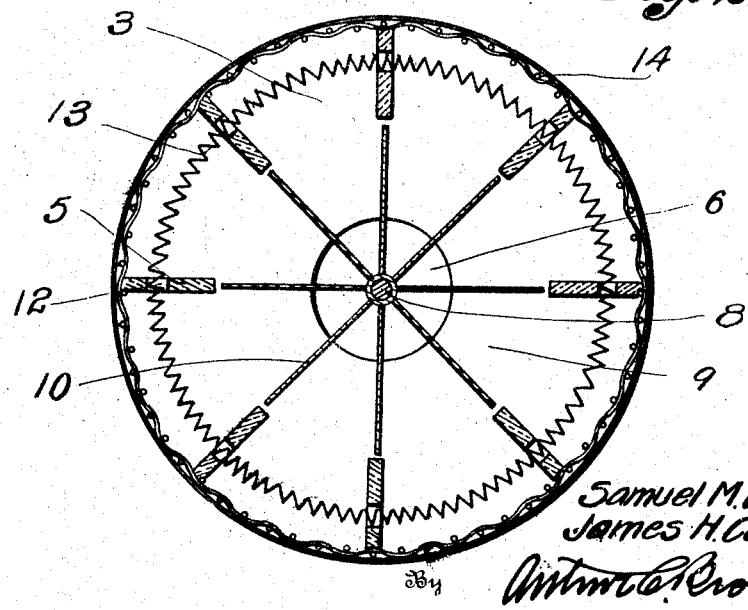

In the drawings,

Figure 1 is a vertical, longitudinal, sectional view through a heater constructed in accordance with our invention, and Fig. 2 is a transverse, sectional view on the line 2—2 of Fig. 1.

The invention is illustrated as comprising a stand or base 1, which may be of any preferred construction but which is preferably hollow and provided with air inlet openings 2. The stand or base 1 supports the casing shown as consisting of the disks 3 and 4 spaced apart and connected by spaced posts or flat blades 5. The disk 3 is provided with a central opening 6 communicating with the interior of the hollow casing 1 so that air may be drawn by the impeller through the openings 2 and 6 into the impeller casing.

The disk 4 supports a motor 7 having a depending shaft 8 extending into the space 9 of the motor casing and carrying a plurality of radial blades 10, preferably connected at their upper edges by a baffle disk 11.

The posts or blades 5 are provided with holes or perforations 12, through which coils 13 of a heating element may pass. The heating element may consist of any appropriate resistance material and it will preferably be threaded through the openings 12 in the form of a continuous spiral. The outer edge or perimeter of the casing is open but guarded by a screen 14, the open perimeter allowing free egress of the air which is passed through the casing by the impeller blades 10.

The motor and heating coil may be connected in parallel series to an electric conductor 15, the circuit being adapted to be made and broken by a switch 16 of approved construction.

When the parts are assembled as shown in Fig. 1 and the current is turned on, air will be drawn through the openings 2, up through the opening 6 and directed outwardly by the impeller blades between the radial blades 5, past the heating coil, where its temperature will be raised, and passed in radial stream lines from the perimeter of the casing. If the heater is set in the center of the room, the heated air will be directed in uniform stream lines from the axis of the heater so that a relatively large zone within the room will be heated direct, the temperature of the remaining air in the room being raised by the induced heated air directed from the heater.

A device such as contemplated by the present invention is inexpensive to manufacture, has a symmetrical appearance and is adapted to raise the temperature of the air in the room in an effective manner.

What we claim and desire to secure by Letters-Patent is:

1. An electric heater comprising a substantially circular horizontal casing, a base supporting said casing and communicating with the bottom thereof, vertical posts spaced about the perimeter of the casing, heating elements carried by the posts, and an air impeller concentric within the casing.

2. An electric heater comprising a substantially circular horizontal casing, a base supporting said casing and communicating with the bottom thereof, vertical posts spaced about the perimeter of the casing, heating elements carried by the posts, and an air impeller comprising fan blades concentric with the casing.

3. A heater comprising a hollow perforate base, a horizontal cylindrical casing carried by the base and communicating therewith, radial flat blades within the casing and at the perimeter thereof, a heating element within the casing, and an air impeller within the casing.

4. A heater comprising a hollow base having air inlet openings, a horizontal casing supported by and communicating with said base, radial, stationary blades within the casing, a heating coil carried by said blades, a motor carried by the casing and having a shaft extending therethrough, radial blades carried by the shaft, and means for energizing the motor and the heating coil.

5. A heater comprising a substantially cylindrical horizontal casing having an air inlet opening, a base supporting said casing, heater supporting elements spaced about the perimeter of the casing, and an air impeller within the casing for drawing air through the inlet and discharging it past the heating elements in substantially radial stream lines.

In testimony whereof we affix our signatures.

SAMUEL M. CARMEAN.
JAMES H. CARMEAN.